2,943,097
BIS-SULFONES BY REACTION OF QUINONES WITH BIS-SULFINIC ACIDS

Michael T. Beachem, New Brunswick, N.J., assignor to American Cyanamid Company, New York, N.Y., a corporation of Maine No Drawing. Filed Feb. 24, 1958, Ser. No. 716,849

4 Claims. (Cl. 260—396)

This invention relates to bis-sulfones of the following formula:

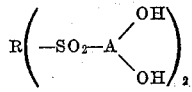

where R is an aliphatic or cycloaliphatic hydrocarbon radical, the $SO_2$ groups being attached to different carbon atoms, and A is an aromatic carbocyclic ring system of less than three rings, the OH groups being attached to the aromatic ring either in the 1,4-positions or the 1,2-positions on the same ring connected to the sulfur of the $SO_2$ group. In other words, the OH groups are attached to carbon atoms separated by an even number of carbon atoms, i.e. 0 or 2.

Typical hydrocarbon residues represented by R are as follows: tetramethylene; 1-methyltetramethylene; hexamethylene; 2-methyltetramethylene; 1,4-dimethyltetramethylene; decamethylene; 1-n-octylethylene; 1-n-pentylpentamethylene; 1-ethyl-1,5,5-trimethylpentamethylene; 3-n-pentylpentamethylene; 2,7-dimethyloctamethylene; 1,4-di-n-propyltetramethylene; undecamethylene; 1-methyldecamethylene; 3-methylundecamethylene; 3-ethylundecamethylene; 1,1,8,8-tetramethyloctamethylene; dodecamethylene; tridecamethylene; 3-methyldodecamethylene; 2-methyldodecamethylene; 1-methyldodecamethylene; tetradecamethylene; 2-methyltridecamethylene; 3-methyltridecamethylene; pentadecamethylene; 2,12-dimethyltridecamethylene; 3-methyltetradecamethylene; 2,13-dimethyltetradecamethylene; heptadecamethylene; octadecamethylene; nonadecamethylene; eicosamethylene; uneicosamethylene; pentacosamethylene; octacosamethylene; 1,4-cyclohexylene; and 1,3-cyclopentylene.

Typical of the aromatic carbocyclic radicals are substituted and unsubstituted phenyl, naphthyl, etc.

The invention further relates to quinones derived from the bis-sulfones defined above, the quinones being represented by the formula

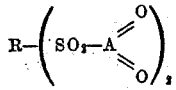

where R is as defined above and A is an aromatic ring system of less than three rings (such as benzene and napththalene), the two ketone groups of the quinone being attached to the ring systems in a 1,4-position or a 1,2-position.

The quinones are obtained from the corresponding dihydroxy derivatives by the usual method for such conversion which involves oxidation. Various oxidizing agents may be used but a convenient process involves treatment with potassium dichromate in an organic solvent such as glacial acetic acid.

The quinones are colored substances which are usable as coloring matters in printing inks and similar vehicles containing aromatic hydrocarbons.

The new sulfones react with formaldehyde to give resins and are useful as intermediates for the preparation of other organic compounds.

The invention will be illustrated in the following specific examples in which the parts are by weight unless otherwise specified.

EXAMPLE 1

*1,4-butane-bis-sulfinic acid*

$$HO_2S-(CH_2)_4-SO_2H$$

To a solution of 65.5 parts of anhydrous sodium sulfite in 310 parts of water is added 128 parts of magnesium sulfate heptahydrate. A heavy precipitate is formed. The mixture is then heated to 40° C. and 51 parts of 1,4-butane-bis-sulfonyl chloride is added, care being taken that the reaction mixture remains alkaline to Brilliant Yellow Red which is effected by the addition of suitable amounts of solid magnesium hydroxide, the amount being of the order of magnitude of 23 parts. During the addition the temperature is maintained between 40° and 50° C. and is effected with agitation which is continued at the same temperature until the reaction is substantially complete. Thereupon the reaction mixture is cooled down with stirring to room temperature and finally chilled and the solid product removed by filtration and dried. The product analyzes as a magnesium salt of 1,4-butane-bis-sulfinic acid. The yield is excellent, but the product at this point contains extensive inorganic impurities.

93 parts of the crude magnesium butane-bis-sulfonate described above and 100 parts of water is added to 140 parts of diethyl ether. The mixture is stirred and cooled to 5° C. and then 50 parts of 5 M sulfuric acid is added very gradually with stirring. A solid product of the free acid forms between the two liquid layers and constitutes 1,4-butane-bis-sulfinic acid with a melting point of 122–126° C. The product is not completely pure and, upon recrystallization, colorless crystals are obtained.

EXAMPLE 2

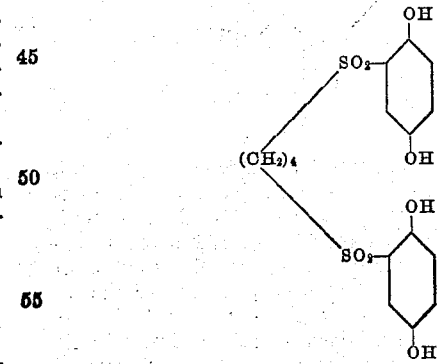

A paste is prepared by mixing 2.16 parts of 1,4-benzoquinone and 1.86 parts of 1,4-butane-bis-sulfinic acid with 4 parts of glacial acetic acid. The paste is then clarified by the addition of 4 parts of water and filtration. The filtrate is then allowed to stand at room temperature until a crystalline solid separates out which is removed by filtration, washed with 1:1 acetic acid-water mixture. The filtrate is then concentrated to a total of 2.7 parts and additional solid precipitates out. The product can be further purified by recrystallization from 20 parts of water.

EXAMPLE 3

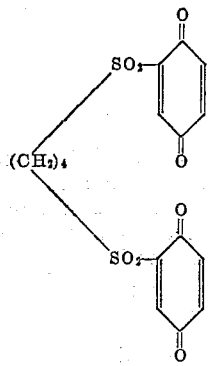

A mixture of 1.85 parts of the product from Example 2, 3.23 parts of potassium dichromate, 30 parts of glacial acetic acid and 5 parts of water is stirred overnight at room temperature. A crude solid precipitate is isolated by filtration. The product corresponds to the formula above. It is a yellow coloring matter.

EXAMPLE 4

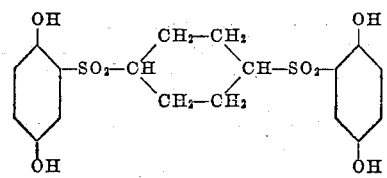

The procedure of Example 2 is followed except that 2.81 parts of 1,4-cyclohexane-bis-sulfinic acid is used in place of 1.86 parts of 1,4-butane-bis-sulfinic acid. A similar product is obtained.

By oxidation of the product using the procedure described in Example 3, the corresponding quinone is formed.

EXAMPLE 5

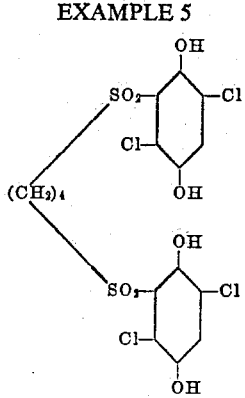

A mixture of 3.72 parts of 1,4-butane-bis-sulfinic acid, 7.1 parts of 2,5-dichloro-1,4-benzoquinone and 20 parts of 1:1 acetic acid-water mixture is warmed gently until solution is clear and then allowed to stand at room temperature. After reaction is complete, the solution is concentrated to dryness at reduced pressure and the residue dissolved in a dilute aqueous sodium hydroxide solution. This is then acidified with dilute hydrochloric acid, resulting in the precipitation of a brownish-colored solid which is removed by filtraton and which corresponds to the formula given above.

By oxidation of the product with potassium dichromate according to the procedure described in Example 3, the corresponding quinone is obtained.

EXAMPLE 6

*1,10-decane-bis-sulfinic acid*

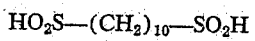

A solution of 100 parts of 1,10-dibromodecane and 360 parts of anhydrous ethanol is prepared and 47.1 parts of thiourea added and the mixture refluxed until the reaction is complete. Thereupon the volume is concentrated at reduced pressure to about half and 150 parts of anhydrous diethyl ether added with stirring. A colorless precipitate forms which is removed by filtration, washed with ether and dried. It is 1,10-decane-bis-pseudothiuronium bromide.

147 parts of 1,10-decane-bis-pseudothiuronium bromide, prepared above, is dissolved in 1500 parts of water. The solution is maintained at 25–30° C. and anhydrous chlorine is passed in. The mixture becomes light yellow and a colorless crystalline solid product separates. This is removed by filtration, washed with water to give a creamy-colored solid product which is crude 1,10-decane-bis-sulfonyl chloride.

A slurry is prepared of 108.3 parts of sodium bicarbonate, 79.5 parts of sodium sulfite and 300 parts of water. The slurry is stirred at 45–55° C. and the crude 1,10-decane-bis-sulfonyl chloride prepared above is added gradually. After the addition is complete, the reaction mixture is heated to 75–85° C. and maintained at this temperature until reaction is substantially complete. The mixture is then cooled to room temperature and insoluble salts forming are removed by filtration. The filtrate, on standing overnight at room temperature, deposits a precipitate which redissolves on warming. To the clear filtrate is added a solution of about 400 parts of 1:1 hydrochloric acid which causes a colorless precipitate to come down. This is filtered off and dried, giving a product melting at 91–101° C. which is very soluble in methanol, ethanol, isopropanol and dioxane, and fairly soluble in acetonitrile, but insoluble in diethyl ether and in benzene. Analysis by infrared shows that the product is a disulfinic acid and is uncontaminated by sulfonic acid groups.

EXAMPLE 7

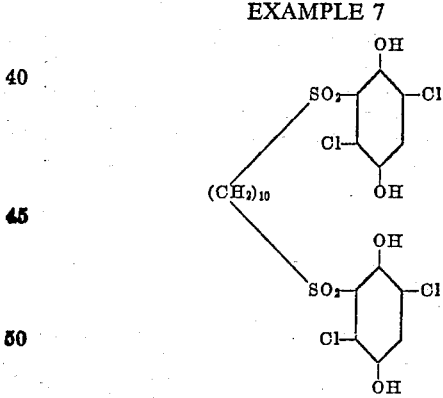

The procedure of Example 5 is followed except that 5.4 parts of 1,10-decane-bis-sulfinic acid is used in place of the 3.72 parts of 1,4-butane-bis-sulfinic acid. A similar product is obtained.

By the use of an oxidation procedure similar to that described in Example 3, the product may be converted to the corresponding quinone.

EXAMPLE 8

*2-methyl-butane-1,4-bis-sulfinic acid*

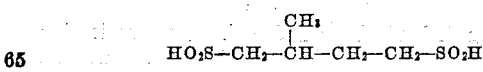

A mixture of 100 parts of water, 26.5 parts of sodium sulfite and 86.1 parts of sodium bicarbonate is heated and stirred at 45–50° C. until solution is complete. Thereupon 26.9 parts of 2-methyl-butane-1,4-bisulfonyl chloride, which is obtained from 1,4-dibromo-2-methylbutane by conversion to the disulfonyl chloride by the Strecker synthesis with alkyl halide and an alkali metal sulfite followed by conversion to the disulfonyl chloride by treatment with phosphorus pentachloride, is added gradually. At the end of the addition the pH is 7.5 and the solution which is slightly cloudy is stirred for a further period of time at 70–80° C. until the reaction is complete. The cloudy reaction mixture is then filtered at 50° C. and the clear filtrate cooled to 5° C. and acidified by the gradual addition of 22 parts of concentrated hydrochloric acid. A solid precipitates which is filtered off and dried.

EXAMPLE 9

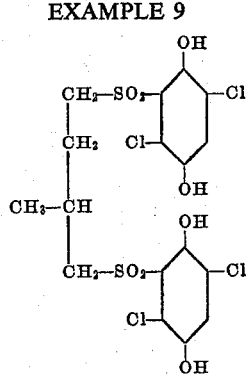

The procedure of Example 5 is followed except that 4 parts of 2-methyl-butane-1,4-bis-sulfinic acid is used in place of 3.72 parts of 1,4-butane-bis-sulfinic acid.

The product may be converted to the corresponding quinone by the use of a procedure similar to that described in Example 3.

EXAMPLE 10

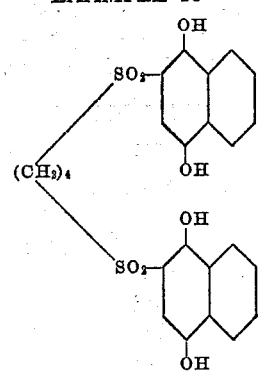

A mixture of 9.3 parts of 1,4-butane-bis-sulfinic acid, 15.8 parts of 1,4-naphthoquinone and 159 parts of glacial acetic acid is stirred until reaction is complete. A crude solid precipitate forms and is removed by filtration. The precipitate is then purified by recrystallization from ethanol after a preliminary clarification of activated carbon.

EXAMPLE 11

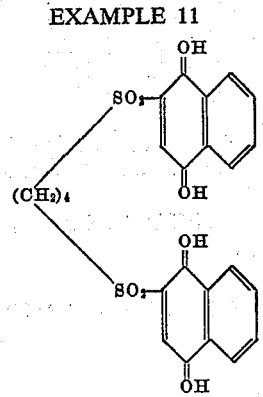

A solution of 3 parts of the product from Example 10 in 420 parts of glacial acetic acid was prepared by warming on a steam bath at 70–80° C. A solution of 4.2 parts of potassium dichromate in 50 parts of water was then added to the glacial acetic acid solution with stirring. After a short period of time a yellow product separated which, upon recrystallization from dimethyl formamide, is identified as the product above by analysis.

EXAMPLE 12

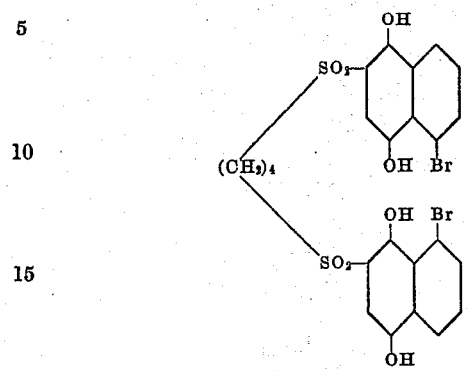

A mixture of 9.3 parts of 1,4-butane-bis-sulfinic acid, 23.7 parts of 5-bromo-1,4-naphthoquinone and 150 parts of glacial acetic acid is stirred until reaction is complete. A crude solid precipitate forms and is removed by filtration. The precipitate corresponds to the formula given above.

By oxidation of the product with potassium dichromate according to the procedure described in Example 11, the corresponding quinone is formed.

EXAMPLE 13

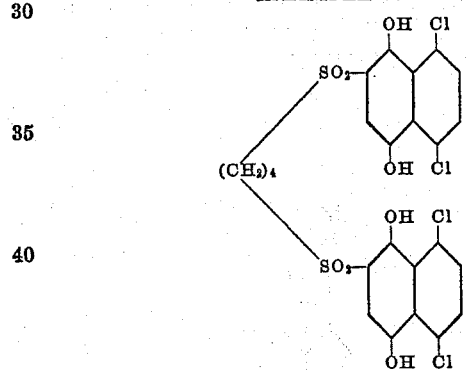

A mixture of 9.3 parts of 1,4-butane-bis-sulfinic acid, 22.7 parts of 5,8-dichloro-1,4-naphthoquinone and 150 parts of glacial acetic acid is stirred until reaction is complete. A solid precipitate forms which is isolated by filtration. The product corresponds to the formula above.

By oxidation of the product with potassium dichromate according to the procedure described in Example 11, the corresponding quinone is obtained.

EXAMPLE 14

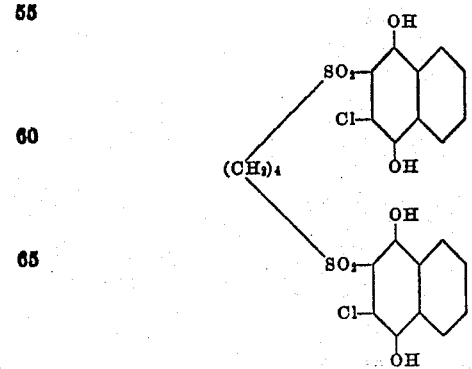

A mixture of 9.3 parts of 1,4-butane-bis-sulfinic acid, 19.2 parts of 3-chloro-1,4-naphthoquinone and 150 parts of glacial acetic acid is stirred until reaction is complete. A solid precipitate is isolated by filtration. The product corresponds to the formula given above.

By oxidation of the product with potassium dichromate according to the procedure described in Example 11, the corresponding quinone is obtained.

EXAMPLE 15

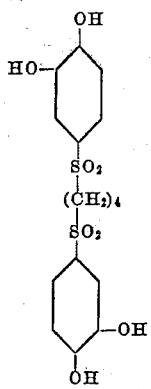

A mixture of 2.16 parts of 1,2-benzoquinone and 1.86 parts of 1,4-butane-bis-sulfinic acid is mixed in a mortar with 10 parts of glacial acetic acid. The paste is clarified by the addition of 4 parts of water and filtration. The filtrate is allowed to stand until a solid separates out which is removed by filtration and washed with water. The product corresponds to the formula given above.

By oxidation of the product with potassium dichromate according to the procedure described in Example 11, the corresponding quinone is obtained.

EXAMPLE 16

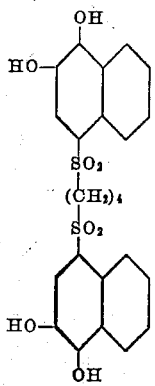

A mixture of 9.3 parts of 1,4-butane-bis-sulfinic acid, 15.8 parts of 1,2-naphthoquinone and 159 parts of glacial acetic acid is stirred until reaction is complete. A crude solid precipitate forms and is removed by filtration. The precipitate corresponds to the formula given above.

EXAMPLE 17

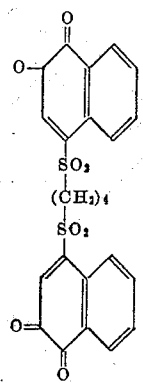

A solution of 2.3 parts of the reaction product from Example 16, 3.23 parts of potassium dichromate and 30 parts of glacial acetic acid was prepared and 10 parts of water was added slowly at room temperature. The reaction was stirred at room temperature for 18 hours, filtered and washed with water. The product is an orange-colored solid which upon analysis by infrared absorption shows a strong carbonyl absorption at 5.9 mu and sulfone absorption at 7.77 and 8.8 mu.

EXAMPLE 18

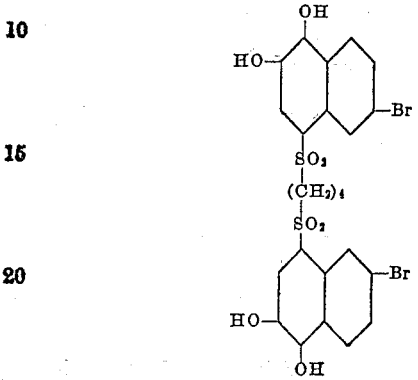

A mixture of 9.3 parts of 1,4-butane-bis-sulfinic acid, 23.7 parts of 6-bromo-1,2-naphthoquinone and 150 parts of glacial acetic acid is stirred until the reaction is complete. A crude solid precipitate forms and is removed by filtration. The product corresponds to the formula given above.

By oxidation of the product with potassium dichromate according to the procedure described in Example 17, the corresponding quinone is obtained.

EXAMPLE 19

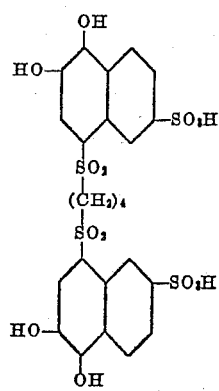

A mixture of 9.3 parts of 1,4-butane-bis-sulfinic acid, 23.8 parts of 1,2-naphthoquinone-6-sulfonic acid and 150 parts of glacial acetic acid is stirred until reaction is complete. A crude solid precipitate forms and is removed by filtration. The precipitate corresponds to the formula above.

By oxidation of the product using the procedure described in Example 17, the corresponding quinone is formed.

EXAMPLE 20

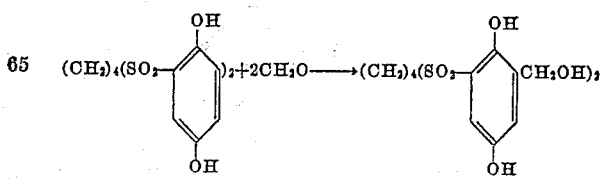

4.02 parts of tetramethylenedisulfonyldihydroquinone prepared as described in Example 2 (.01 mole) is dissolved in 100 parts of methanol and stirred with 1.62 parts of 37% formalin solution (.02 mole). The resulting product obtained by removing the methanol and water

EXAMPLE 21

*1,12-dodecane-bis-sulfinic acid*

The procedure of Example 6 is followed except that 109 parts of 1,12-dibromdodecane is used in place of 100 parts of 1,10-dibromdecane. A similar product, 1,12-dodecane-bis-pseudothiuronium bromide, is obtained.

In the second step the procedure is also the same as in Example 6 with 160 parts of 1,12-dodecane-bis-pseudothiuronium bromide is used in place of 147 parts of 1,10-decane-bis-pseudothiuronium bromide. A similar product is obtained.

EXAMPLE 22

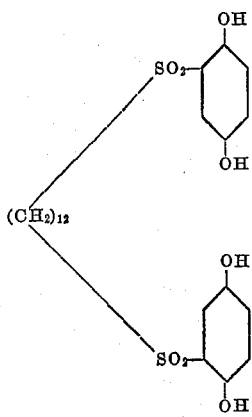

The procedure of Example 2 is followed except that 2.98 parts of 1,12-dodecane-bis-sulfinic acid is used in place of 1.86 parts of 1,4-butane-bis-sulfinic acid. A similar product is obtained.

By oxidation of the product using the procedure described in Example 3, the corresponding quinone is formed.

EXAMPLE 23

*1,18-octadecane-bis-sulfinic acid*

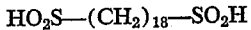

The procedure of Example 6 is followed except that 137 parts of 1,18-dibromoctadecane is used in place of 100 parts of 1,10-dibromdecane, and 188 parts of 1,18-octadecane-bis-pseudothiuronium bromide is used in place of 147 parts of 1,10-decane-bis-pseudothiuronium bromide. A similar product is obtained.

EXAMPLE 24

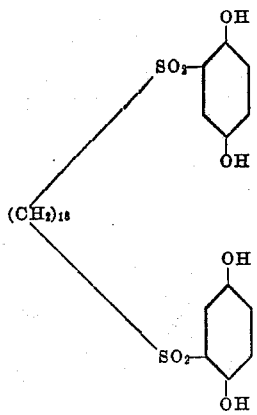

The procedure of Example 2 is followed except that 3.82 parts of 1,18-octadecane-bis-sulfinic acid is used in place of 1.86 parts of 1,4-butane-bis-sulfinic acid. A similar product is obtained.

By oxidation of the product using the procedure described in Example 3, the corresponding quinone is formed.

This application is in part a continuation of my copending application Serial No. 674,607, filed on July 29, 1957, now abandoned.

I claim:

1. A compound of the formula

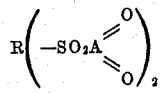

wherein R is selected from the group consisting of 1,3-cyclopentylene, 1,4-cyclohexylene, 1,4-butylene and alkylenes of 5–18 carbon atoms wherein the two

groups are separated by a straight chain of at least four carbon atoms; and

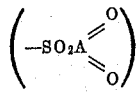

represents a substituted aromatic ring system, and the two

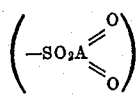

groups being identical and being selected from the group consisting of such ring systems having the formulae

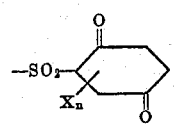

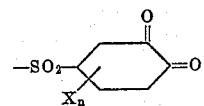

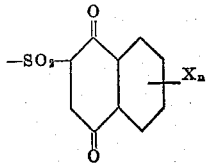

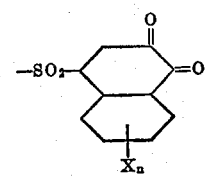

wherein X is a halogen atom having an atomic number between 16 and 36 and $n$ is an integer selected from the group consisting of 0, 1 and 2.

2. A compound of the formula

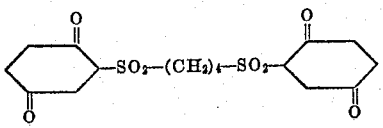

3. A compound of the formula
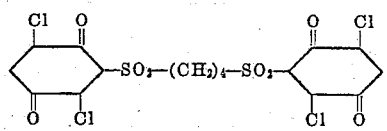
4. A compound of the formula
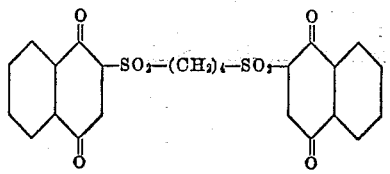
References Cited in the file of this patent
FOREIGN PATENTS
663,992   Germany _____ Aug. 20, 1938
OTHER REFERENCES
Chemical Abstracts, vol. 49, p. 9581 (1955). Abstract of Janczewski et al., Roczniki Chem., vol. 28, pp. 152–3 (1954).
Chemical Abstracts, vol. 50, p. 7757 (1956). Abstract of Janczewski et al., Roczniki Chem., vol. 29, pp. 343–60 (1955).